(12) United States Patent
Yang

(10) Patent No.: US 6,881,063 B2
(45) Date of Patent: Apr. 19, 2005

(54) ELECTROACTIVE POLYMER ACTUATOR BRAILLE CELL AND BRAILLE DISPLAY

(76) Inventor: Peichun Yang, 1825 W. Ray Rd., Apt. 1054, Chandler, AZ (US) 85224

( * ) Notice: Subject to any disclaimer, the term of this patent is extended or adjusted under 35 U.S.C. 154(b) by 0 days.

(21) Appl. No.: 10/708,318

(22) Filed: Feb. 24, 2004

(65) Prior Publication Data
US 2004/0175676 A1 Sep. 9, 2004

Related U.S. Application Data

(60) Provisional application No. 60/449,143, filed on Feb. 24, 2003.

(51) Int. Cl.[7] .............................................. G09B 21/00
(52) U.S. Cl. ..................................................... 434/114
(58) Field of Search ................................ 434/112, 113, 434/114, 115; 340/407.1, 407.2

(56) References Cited

U.S. PATENT DOCUMENTS

| | | | |
|---|---|---|---|
| 5,222,895 A | 6/1993 | Fricke | |
| 5,496,174 A | 3/1996 | Garner | |
| 5,685,720 A * | 11/1997 | Kashi | .......................... 434/114 |
| 5,685,721 A | 11/1997 | Decker | |
| 5,766,013 A | 6/1998 | Vuyk | |
| 6,217,338 B1 * | 4/2001 | Tieman | ....................... 434/114 |
| 6,354,839 B1 | 3/2002 | Schmidt et al. | |
| 6,417,821 B1 | 7/2002 | Becker et al. | |
| 6,445,284 B1 * | 9/2002 | Cruz-Hernandez et al. | ........................ 340/407.1 |
| 6,693,516 B1 * | 2/2004 | Hayward | .................. 340/407.1 |
| 6,743,021 B1 * | 6/2004 | Prince et al. | ................ 434/113 |

* cited by examiner

Primary Examiner—Kurt Fernstrom
(74) Attorney, Agent, or Firm—Molly L. Sauter; Smith & Hopen, P.A.

(57) ABSTRACT

The present invention provides a Braille cell being of compact design and having low power consumption. The novel Braille cell is based on the bending characteristics of electroactive polymers to provide hydraulic actuation of a Braille dot. As such, the bending mechanism of the electroactive polymer actuator is transferred to the linear motion of the Braille dot. Additionally, to reduce power consumption, a latching and support mechanism is provided.

21 Claims, 6 Drawing Sheets

ELECTROACTIVE POLYMER ACTUATOR BRAILLE CELL AND BRAILLE DISPLAY

CROSS-REFERENCE TO RELATED APPLICATIONS

This application claims priority from U.S. provisional application Ser. No. 60/449,143 entitled: "Fabrication of Full Page Braille Display Using the Self Supporting and Hydraulic (SSH) System in the Braille Cell Based on the Bending Mechanism of Electroactive Polymer Actuator", filed Feb. 24, 2003.

BACKGROUND OF INVENTION

The present invention relates to Braille and graphic displays for providing individuals with visual impairments a means to access media through the use of tactile devices.

Prior art in the field of Braille displays for computer interfaces utilize various mechanisms to actuate the Braille dots and refresh the text. Actuators known in the art comprised of piezoelectric materials, shape memory alloys and solenoids control the Braille dots. These actuators serve to raise and lower the individual pins to represent the Braille characters. The Braille cell displays utilizing these actuator technologies are limited to the display of one or two lines. The size and complexity of the actuators and the tight tolerance requirements for the Braille dots limits the number of Braille characters that can be presented simultaneously. These Braille cell devices known in the art also exhibit high power requirements, slow refresh rates and complex manufacturing processes.

Due to the limitations inherent in the Braille cells available to construct Braille cell displays, current technology provides for Braille displays that are limited to a few lines as displayed on a computer screen at one point in time. It is advantageous to be able to provide a reader with a full-page Braille display representing an entire screen. The fabrication of a full-page Braille display will allow the reader to access both character and graphic information.

Electroactive polymers are known in the art. These polymers respond to external electrical stimulation by displaying a significant shape or size displacement. Electroactive polymers have the ability to induce strains that are as high as two orders of magnitude greater than the movements possible with rigid and fragile electroactive ceramics, such as piezoelectric materials. Electroactive polymers inherently exhibit quicker response times, lower densities and improved resilience when compared to shape memory alloys. Two major categories of electroactive polymers are identifiable based on their driving mechanism. Electronic electroactive polymers are driven by the Coulomb forces resulting from the electric field applied, while ionic electroactive polymers are driven by the mobility or diffusion of ions.

A need exists for a refreshable Braille display that overcomes the prior art limitations by providing a tactile array that can give readers access to full computer generated screens of text and graphical information in real time. Accordingly, an improved Braille cell is needed that will allow the construction of a full Braille cell display. The Braille cell needs to have a quick response time, be compact in size, operate under low power, and be lightweight while still providing the necessary tactile response to the reader.

However, in view of the prior art considered as a whole at the time the present invention was made, it was not obvious to those of ordinary skill in the pertinent art how the identified need could be fulfilled.

SUMMARY OF INVENTION

The longstanding but heretofore unfulfilled need for a Braille cell that exhibits desired characteristics superior to Braille cells known in the art is now met by a new, useful, and nonobvious invention.

The present invention provides a Braille cell being of compact design and having low power consumption. The novel Braille cell is based on the bending characteristics of electroactive polymers to provide hydraulic actuation of a Braille dot. As such, the bending mechanism of the electroactive polymer actuator is transferred to the linear motion of the Braille dot. Additionally, to reduce power consumption, a latching and support mechanism is provided.

In accordance with the present invention is provided a Braille cell having a substantially fluid-tight housing, the fluid-tight housing further comprising a tactile member cover, a tactile member in the housing, the tactile member being movable between a neutral position at which the tactile member is substantially flush with the tactile member cover and is not palpable and a reading position at which the tactile member is extended beyond the tactile member cover and is palpable, a support member in the housing for supporting the tactile member when the member is in the reading position, and an actuator integrally connected to the support member for moving the tactile member between a neutral position and a reading position through the displacement of fluid within the substantially fluid-tight housing. The actuator is actuated by an electrical voltage and further includes an electroactive polymer, which bends upon application of an electrical voltage, the bending of the electroactive polymer, to displace a fluid volume within the housing is sufficient to move the tactile member between a neutral position and a reading position. Additionally, the bending of the electroactive polymer is sufficient to move the support member to support the tactile member when in the reading position.

In an embodiment of the present invention, the novel Braille cell includes a substantially fluid-tight housing having a top end and a bottom end, an opening in the top end of the housing is fluidly sealed with a flexible diaphragm, the flexible diaphragm has a topside and an underside. Additionally, at least two support blocks and a stabilizer block are positioned at the bottom end of the housing. The stabilizer block is positioned between the two support blocks. An actuator rod having a top end and a bottom end is provided, whereby the top end of the actuator rod is secured to the underside of the flexible diaphragm and the bottom end of the rod is secured to the stabilizer block. At least two electroactive polymer bending elements are included, each element having a top edge and a bottom edge. The bottom edge of each of the electroactive polymer bending elements is secured to one of the two support blocks and the top edge of each of the electroactive polymer bending elements is secured to the housing.

In an additional embodiment, the housing of the novel Braille cell further includes, two substantially continuous sides and two windowed sides, the windowed sides further having a support strip positioned to establish a top aperture and a bottom aperture. In one embodiment, the two continuous sides are positioned opposite each other and the two windowed sides are positioned opposite each other in the housing, thereby providing a substantially rectangular housing. Additionally, four electroactive polymer bending elements are provided, each of the four electroactive polymer bending elements are positioned to cover one of each of the top aperture and the bottom aperture of the two windowed sides, wherein one edge of each bending element is secured to the support strip.

The Braille cell further includes a Braille dot positioned on the topside of the flexible diaphragm.

The electroactive polymer bending elements in accordance with the present invention include an electroactive polymer layer secured to a substantially rigid layer. The electroactive polymer layer may be an electronic electroactive polymer such as a poly vinylidene fluoride (PVDF) or an ionic electroactive polymer such as an ionomeric polymer metal composite (IPMC). Additional electroactive polymers known in the art are also within the scope of the present invention. To supply the voltage necessary to activate the electroactive polymer, the electroactive polymer layer further includes a plurality of photo lithographed microelectrodes. The microelectrodes are placed in alternating fashion having a common positive bus and a common negative bus. A switchable power supply is provided in circuit communication with the microelectrodes of the electroactive polymer bending element. The switchable power supply delivers a voltage to the microelectrodes sufficient to result in the bending of the electroactive polymer bending element.

In an additional embodiment, the housing is filled with a fluid. The fluid provides a pressure medium with which to deform the flexible diaphragm. Water, in addition to a variety of fluids are within the scope of the invention. The viscosity of the fluid affects the reaction time of the Braille dot.

In an embodiment of a full-page refreshable Braille display apparatus in accordance with the present invention, is provided a plurality of Braille cells, each Braille cell including a substantially fluid-tight housing, the fluid-tight housing further comprising a tactile member cover, a tactile member in the housing, the tactile member being movable between a neutral position at which the tactile member is substantially flush with the tactile member cover and is not palpable and a reading position at which the tactile member is extended beyond the tactile member cover and is palpable. A support member in the housing is included for supporting the tactile member when the member is in the reading position, and an actuator is integrally connected to the support member for moving the tactile member between a neutral position and a reading position through the displacement of fluid within the substantially fluid-tight housing. The actuator is actuated by an electrical voltage and further includes an electroactive polymer which bends upon application of an electrical voltage, the bending of the electroactive polymer displaces a fluid volume within the housing sufficient to move the tactile member between a neutral position and a reading position, the bending of the electroactive polymer is sufficient to move the support member to support the tactile member when in the reading position.

An important advantage of the present invention is that the novel Braille cell disclosed is very compact, thereby allowing the fabrication of a full-page Braille display able to demonstrate both character and graphic information.

An additional advantage of the present invention is the reduction in power requirements for the Braille cell. The combination of the electroactive polymer actuator and the stabilizer and support blocks provides a hydraulic and latching mechanism that provides an over 30 gram supporting force for the Braille dot. The power consumption is very low because the latching action of the stabilizer block and support members provides the large supporting force for the Braille dot. The power required to drive the electroactive polymer bending elements to generate the pressure to push up the diaphragm is relatively low and the supporting force is then supplied by the support members.

Another advantage of the present invention is the realization of a less than 100 ms response time. This response time can be achieved because the response time for the electroactive polymer bending elements is in the range of milliseconds due to the characteristics of the electroactive polymer.

BRIEF DESCRIPTION OF DRAWINGS

For a fuller understanding of the invention, reference should be made to the following detailed description, taken in connection with the accompanying drawings, in which.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The supporting force required for a Braille dot within a Braille display is approximately 30 grams. This supporting force is sufficient to provide the reader with a comfortable tactile feel. Concurrently, an approximately 0.7 mm displacement for the Braille dot insures that the dot will be palpable by the reader. Thees requirements must be met within less than an approximately 100 ms response.

The present invention provides a Braille cell based on electroactive polymer actuator technology, which overcomes the limitations of the piezo electric ceramic (PZT) Braille cell commonly used in the art. It is known that the strain of the PZT material is small, and therefore a long lever type bimorph is required to make an actuator using PZT technology to move the Braille dot. The long lever bimorphs required a significant amount of space. Due to the large space requirements, there is a limitation to how many PZT Braille cells can be incorporated into a Braille display. The Braille cell of the present invention overcomes the size limitations associated with PZT Braille cells.

The present invention utilizes electroactive polymer actuators. Due to the inherent characteristics of the electroactive polymer active material, a large displacement can be obtained that will move the Braille dot. Additionally, the electroactive polymer is light weight and the power consumption is very low. As such, the light, compact and electrically efficient Braille cells in accordance with the present invention allow a full page Braille display to be fabricated. Additionally, modern microelectronic processing technology can be used to manufacture the devices.

Figure 1:
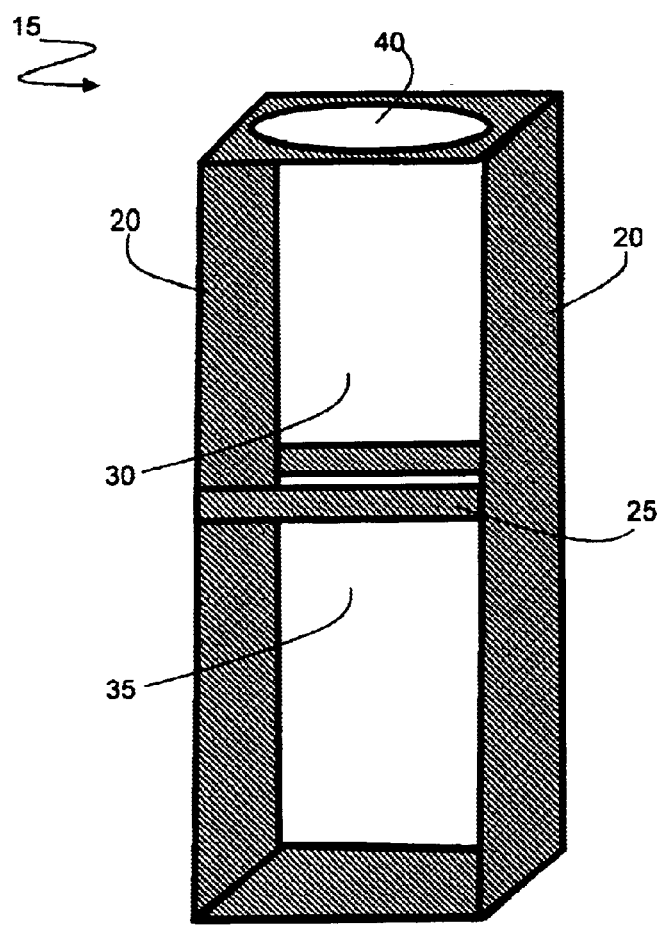
FIG. 1 is a diagrammatic view of the housing of the Braille cell in accordance with the present invention.

With reference to FIG. 1, in an exemplary embodiment of the Braille cell in accordance with the present invention, the device includes a rectangular fluid-tight housing 15, the fluid-tight housing having two substantially continuous sides 20 and two windowed sides further including a support strip 25, the positioning of the support strip resulting in a top aperture 30 and a bottom aperture 35 for each windowed side. An opening exits in the top end of the housing 40. The opening is dimensioned to accommodate a Braille dot.

Figure 2:
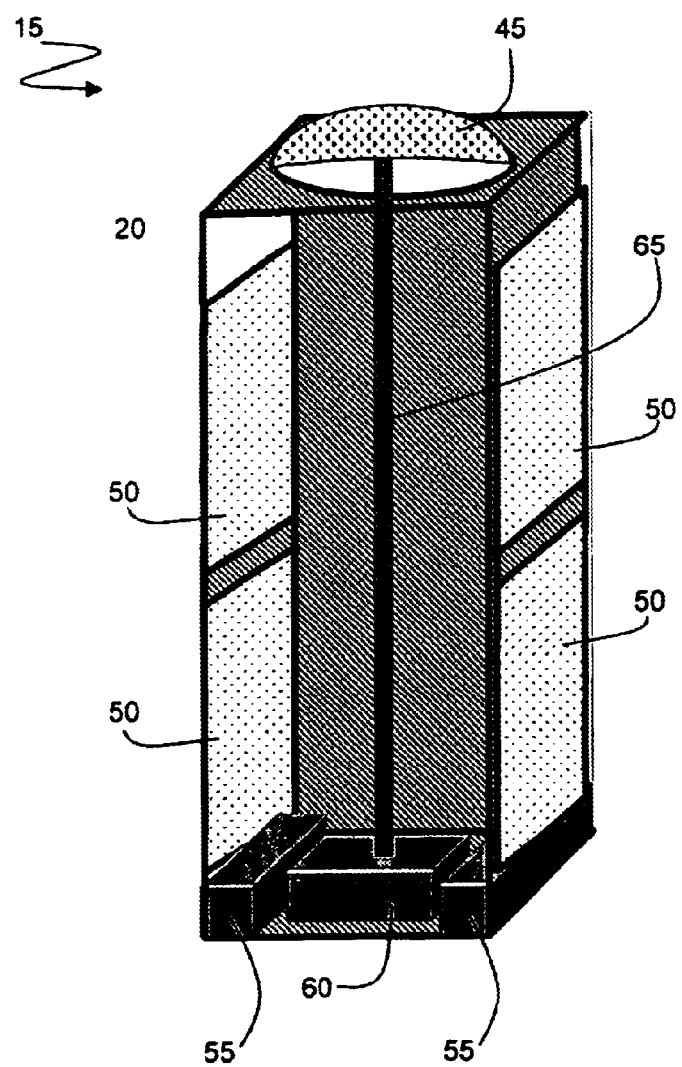
FIG. 2 is a diagrammatic view of the Braille cell in accordance with the present invention.

With reference to FIG. 2, the Braille cell is shown with one continuous side displaced. The Braille cell further includes a flexible diaphragm 45 positioned to cover the opening in the top of the housing. A rubber membrane, a preformed membrane or other means of providing a flexible diaphragm are within the scope of the invention. Four electroactive polymer bending elements 50 are positioned to cover the top aperture and bottom aperture of each windowed side. One edge of each bending element is secured to the support strip and the other end secured to the housing. Additional fluid-tight membrane material enclosing the housing establishes the fluid tight condition of the housing. The housing contains, a gas, or water or another appropriate liquid or gas to serve as the pressure transferring medium. A novel latching mechanism with two supporting blocks 55 attached to the electroactive bending elements 50 and a thin actuator rod 65 attached at one end to the flexible diaphragm 45 and at the other end to a stabilizer block 60 provides over 30 grams of supporting force with which to support the Braille dot. As such, the Braille cell apparatus transfers the bending of the electroactive polymer actuator into the linear motion of the Braille dot.

Figure 3:
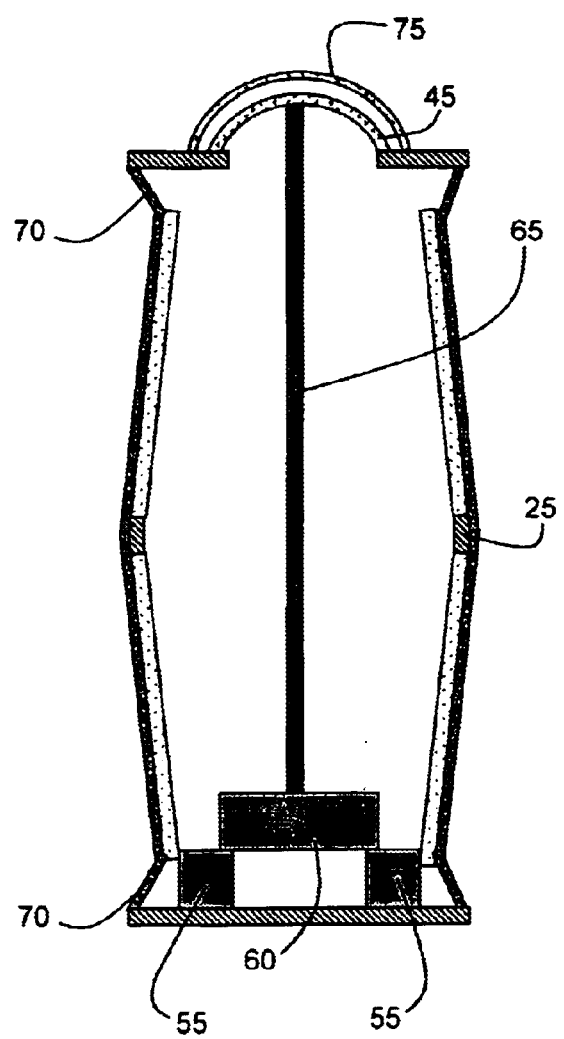
FIG. 3 is a diagrammatic view of the operation of the Braille cell in a palpable state in accordance with the present invention.
Figure 4:
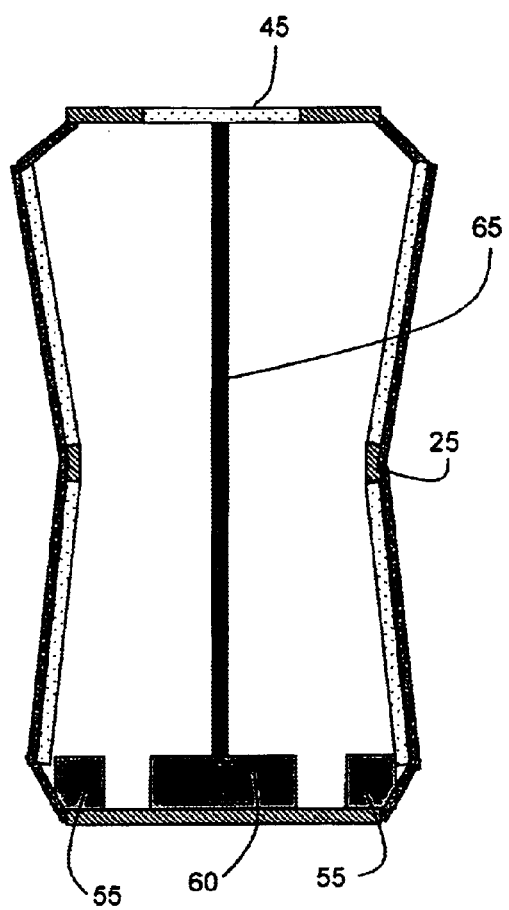
FIG. 4 is a diagrammatic view of the operation of the Braille cell in an impalpable state in accordance with the present invention.

The 30 grams supporting force for the Braille dot is necessary only when the reader is palpating the Braille dot. The force that is needed to move the Braille dot to a readable position is much less than 30 grams. Based on this observation, a novel hydraulic and latching mechanism is employed to make a Braille cell that can provide 30 grams supporting force to give the reader a comfortable feeling when brushing their finger tip on the Braille dot. As shown with reference to FIG. 3, the four electroactive polymer bending elements 50 are fixed at the supporting strip 25 at two sides. As shown, upon application of an electric field, the top of the bending elements covering the top aperture 30 can bend towards the inside and the outside of the housing and the bottom of the bending elements covering the bottom aperture 35 can also bend towards the inside and the outside of the housing. The four bending elements are attached to a rubber membrane or preformed membrane 70, which is used to seal the housing. A gas or a liquid, such as water or other liquids, may be used to fill up the housing to serve as the pressure transferring media. Additionally, a gas may also be used to fill the housing to serve as the pressure transferring media. The actuator rod 65 is attached to the bottom of the flexible diaphragm 45 to seal the opening 40 at the top of the housing. The stabilizer block 60 is secured to the bottom of the actuator rod 65. The support blocks 55 are secured to the bottom edge of the electroactive polymer bending element 50 covering the bottom aperture 35. The Braille dot 75 is positioned on top of the flexible diaphragm. FIG. 3 in combination with FIG. 4 illustrates the working sequence of the Braille cell based on the bending of the electroactive polymer. At a first step, as shown in FIG. 3, the four bending elements 50 will bend towards the inside the housing when power is applied. As the bending elements bend towards the inside, pressure will be exerted on the liquid or gas, which will then push up the flexible diaphragm 45 at the opening on the top of the housing 15. The movement of the flexible diaphragm 45 will result in a movement of the actuator rod 65 and subsequently the stabilizer block 60. Concurrently, the two supporting blocks 55 which are secured to the lower part of the bending elements 50 and will move towards the center of the housing. Upon sufficient displacement of the fluid, the actuator rod 65 secured to the bottom of the flexible diaphragm 45 will rest on the two supporting blocks 55. The height of the supporting blocks is sufficient to provide the support required for the Braille dot. Therefore a very large supporting force can be generated while keeping the Braille dot at its ideal latching position because the two support blocks underneath support the actuator rod. The bending angle of the electroactive polymer bending elements can be calculated by solving the equation in which the volumetric change caused by the removal of the volume of the liquid or gas inside the cavity and the volumetric change caused by the inflation of the rubber membrane on the top of the cavity are equal.

At a second step, as shown in FIG. 4, when the power orientation supplied to the bending elements 50 is switched, the four bending elements will bend towards the outside of the housing 15. As such, a negative pressure will be generated inside the housing. The combination of this negative pressure and the pressure from the flexible diaphragm will move the Braille dot to its rest position. The two supporting blocks 55 will be moved away from the center of the housing 15 and the actuator rod 65 will drop back to its rest position.

The combination of the first and second steps of the operation of the novel Braille cell as outlined above provides the actuation necessary to present a palpable Braille cell dot for use in a Braille cell display.

Figure 5:
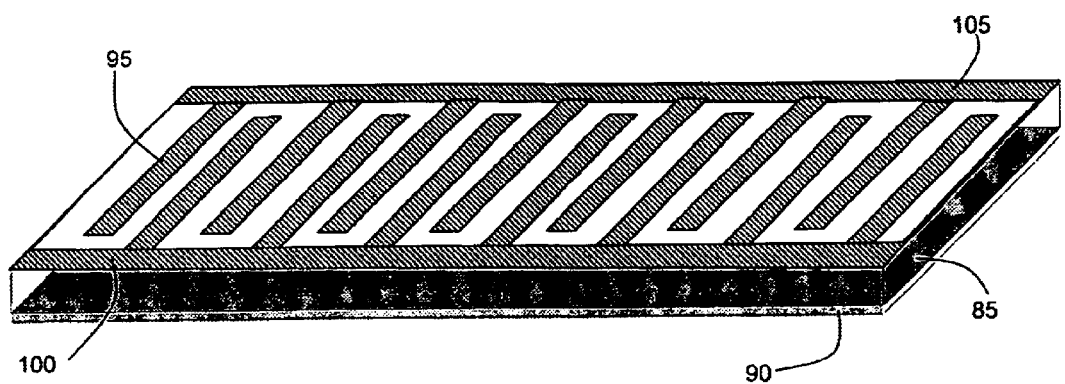
FIG. 5 is a diagrammatic view of the construction of the electroactive polymer bending element in accordance with the present invention.

The electroactive polymer bending elements of the present invention are fabricated based on the bending mechanism of the electrostrictive polymer and ionic conducting (IPMC) polymer actuator. In an exemplary embodiment with reference to FIG. 5, the construction of the polymer bending elements includes providing a flexible electroactive polymer layer 85 secured to a substantially rigid material layer 90. The electroactive polymer layer 85 further includes an array of microelectrodes 95 to enable the application of power to the bending element. In this exemplary embodiment, the array of microelectrodes 95 are manufactured on the PVDF polymer thin film. The microelectrode conductors are placed on one side of the polymer thin film using a photolithograph process. The positive and negative electrode conductors exist in alternate sequence with a common positive bus 100 and a common negative bus 105. The space between positive and negative electrodes is in a range of micrometers to allow a substantial electric field to be exerted between the electrodes. With this configuration of electrodes on the surface of the polymer film, the working voltage necessary for the operation of the device can be lowered dramatically. The asymmetric stress caused by the asymmetric electric field produces the bending of the polymer thin film and therefore the subsequent bending of the electroactive polymer bending element.

Figure 6:
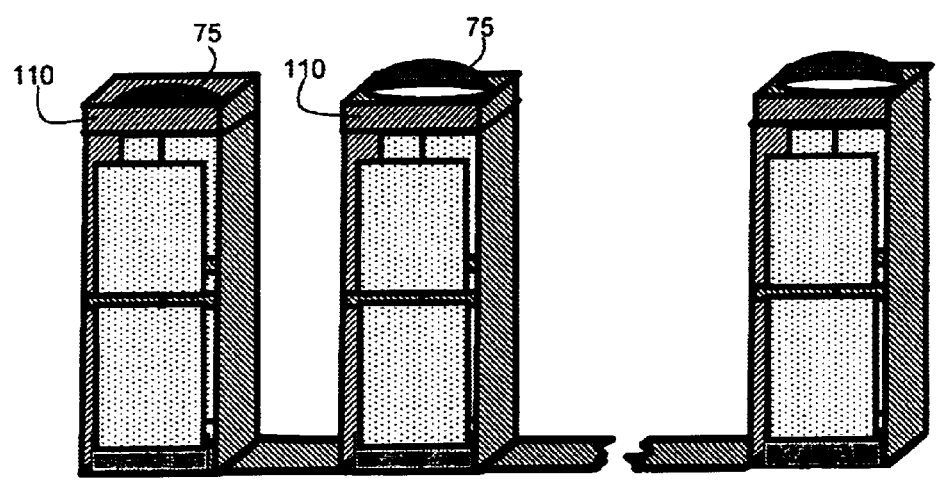
FIG. 6 is a diagrammatic view of the Braille cells on the present invention incorporated into a Braille display assembly.

Highly integrated, low cost, microelectronic processing technology is employed to make an array of the Braille cells for a Braille cell display. With reference to FIG. 6, a row of Braille cells are placed in an array resulting in a full page Braille display. As shown in FIG. 6, the Braille cells, when incorporated into an array, further include a tactile member cover 110. A tactile member cover 110 may be adapted for each individual Braille cell, or a tactile member cover 110 adapted for use with a plurality of Braille cells may be employed. When the Braille dot 75 is in the rest position, the bottom surface of the Braille cell is in contact with the top surface of the housing and the top surface of the Braille cell is flush with the top inner surface of the tactile member cover. FIG. 6(*a*) illustrates a Braille dot in the rest position, being flush with the tactile member cover, and therefore inpalpable. FIG. 6(*b*) illustrates a Braille dot 75 in the palpable position, with the dot raised above the tactile member cover 110.

In conclusion, a novel self supporting and hydraulic (SSH) system is invented in making the compact Braille cell which can provide over 30 grams supporting force, 0.7 mm displacement for the Braille dot and less than 100 ms response time simultaneously. Using this novel Braille cell a full page Braille display which will demonstrate both Braille character and graphic information can be fabricated. The power consumptions is very low. The new Braille cell is made based on the electroactive polymer technology. Therefore, the fabrication process will be highly integrated. The cost for making Braille cell will be lowered dramatically. The new Braille cell is so compact it will be used in a variety places.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A Braille cell comprising:
   a substantially fluid-tight housing having a top end and a bottom end;
   an opening in the top end of the housing, the opening fluidly sealed with a flexible diaphragm, the flexible diaphragm having a topside and an underside;
   at least two support blocks positioned at the bottom end of the housing;
   a stabilizer block positioned at the bottom end of the housing and positioned between the at least two support blocks;
   an actuator rod having a top end and a bottom end, the top end of the actuator rod secured to the underside of the flexible diaphragm and the bottom end of the rod secured to the stabilizer block; and
   at least two electroactive polymer bending elements, each element having a top edge and a bottom edge, the bottom edge of each of the electroactive polymer bending elements secured to one of the at least two support blocks, the top edge of each of the electroactive polymer bending elements secured to the housing.

2. The Braille cell of claim 1, wherein the housing further comprises:
   two substantially continuous sides; and
   two windowed sides, the windowed sides further comprising a support strip positioned to establish a top aperture and a bottom aperture.

3. The Braille cell of claim 2, wherein the two continuous sides are positioned opposite each other and the two windowed sides are positioned opposite each other in the housing.

4. The Braille cell of claim 2, further comprising, four electroactive polymer bending elements, each of the four electroactive polymer bending elements positioned to cover one of each of the top aperture and the bottom aperture of the two windowed sides, wherein one edge of each bending element is secured to the support strip.

5. The Braille cell of claim 1, wherein the housing is substantially rectangular.

6. The Braille cell of claim 1, wherein the housing is filled with a fluid.

7. The Braille cell of claim 6, wherein the fluid is a liquid.

8. The Braille cell of claim 6, wherein the fluid is a gas.

9. The Braille cell of claim 1, wherein the at least two electroactive polymer bending elements are substantially rectangular.

10. The Braille cell of claim 1, wherein the at least two electroactive polymer bending elements are substantially of equal dimension.

11. The Braille cell of claim 1, wherein the electroactive polymer bending element further comprises, an electroactive polymer layer secured to a substantially rigid layer.

12. The Braille cell of claim 11, wherein the electroactive polymer layer comprises an electronic electroactive polymer.

13. The Braille cell of claim 12, wherein the electronic electroactive polymer is a poly vinylidene fluoride, PVDF.

14. The Braille cell of claim 11, wherein the electroactive polymer layer comprises an ionic electroactive polymer.

15. The Braille cell of claim 14, wherein the ionic electroactive polymer is an ionomeric polymer-metal composite.

16. The Braille cell of claim 11, wherein the electroactive polymer layer further comprises:
   a plurality of photo lithographed microelectrodes, the microelectrodes placed in alternating fashion having a common positive bus and a common negative bus.

17. The Braille cell of claim 1, further comprising a switchable power supply in circuit communication with the electroactive polymer bending element, the switchable power supply to deliver a voltage to the electroactive polymer bending element sufficient to result in bending of the electroactive polymer bending element.

18. The Braille cell of claim 1, further comprising a Braille dot positioned on the topside of the flexible diaphragm.

19. A Braille cell comprising:
   a substantially fluid-tight housing having a top end, a bottom end, two facing substantially solid sides and two facing windowed sides, wherein the two facing windowed sides further comprises a support strip positioned to establish a top aperture and a bottom aperture;
   an opening in the top end of the housing, the opening fluidly sealed with a flexible diaphragm, the flexible diaphragm having a topside and an underside;
   two support blocks positioned at the bottom end of the housing;
   a stabilizer block positioned at the bottom end of the housing and positioned between the two support blocks;
   an actuator rod having a top end and a bottom end, the top end of the actuator rod secured to the underside of the flexible diaphragm and the bottom end of the rod secured to the stabilizer block;

a Braille dot positioned on the topside of the flexible diaphragm;

four electroactive polymer bending elements, the bending elements substantially of equal dimensions, each bending element having a top edge and a bottom edge;

a first two of the four electroactive polymer bending elements positioned to cover a bottom aperture of a windowed side, the bottom edge of the first two electroactive polymer bending elements secured to one of the at least two support blocks, the top edge of each of the first two electroactive polymer bending elements secured to the support strip; and a second two of the four electroactive polymer bending elements positioned to cover a bottom aperture of a windowed side, the top edge of the first second electroactive polymer bending elements secured to the top of the housing, the bottom edge of each of the second two electroactive polymer bending elements secured to the support strip.

20. A Braille cell comprising:

a substantially fluid-tight housing having a tactile member cover, the tactile member cover positioned on a top surface of the housing;

a tactile member in the housing, the tactile member being movable between a neutral position at which the tactile member is substantially flush with the tactile member cover and is not palpable and a reading position at which the tactile member is extended beyond the tactile member cover and is palpable;

a support member in the housing for supporting the tactile member when the member is in the reading position;

an actuator integrally connected to the support member for moving the tactile member between a neutral position and a reading position through the displacement of fluid within the substantially fluid-tight housing, the actuator actuated by an electrical voltage and further comprising, an electroactive polymer which bends upon application of an electrical voltage, the bending of the electroactive polymer to displace a fluid volume within the housing sufficient to move the tactile member between a neutral position and a reading position, the bending of the electroactive polymer sufficient to move the support member to support the tactile member when in the reading position.

21. A Braille display apparatus comprising a plurality of Braille cells, each Braille cell comprising a substantially fluid-tight housing, the fluid-tight housing further comprising a tactile member cover, a tactile member in the housing, the tactile member being movable between a neutral position at which the tactile member is substantially flush with the tactile member cover and is not palpable and a reading position at which the tactile member is extended beyond the tactile member cover and is palpable, a support member in the housing for supporting the tactile member when the member is in the reading position, an actuator integrally connected to the support member for moving the tactile member between a neutral position and a reading position through the displacement of fluid within the substantially fluid-tight housing, the actuator actuated by an electrical voltage and further comprising, an electroactive polymer which bends upon application of an electrical voltage, the bending of the electroactive polymer to displace a fluid volume within the housing sufficient to move the tactile member between a neutral position and a reading position, the bending of the electroactive polymer sufficient to move the support member to support the tactile member when in the reading position.

* * * * *